United States Patent
Yu et al.

(10) Patent No.: US 10,032,229 B1
(45) Date of Patent: *Jul. 24, 2018

(54) EMPLOYING SPILLOVER TABLES FOR DATA UPDATES

(71) Applicant: Amazon Technologies, Inc., Reno, NV (US)

(72) Inventors: Qiang Yu, Issaquah, WA (US); David C. Jernberg, Renton, WA (US); Joseph E. Magerramov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 651 days.

This patent is subject to a terminal disclaimer.

(21) Appl. No.: 14/171,223

(22) Filed: Feb. 3, 2014

Related U.S. Application Data

(63) Continuation of application No. 12/823,733, filed on Jun. 25, 2010, now Pat. No. 8,706,619.

(51) Int. Cl.
  *G06Q 40/00* (2012.01)
  *G06Q 20/10* (2012.01)

(52) U.S. Cl.
  CPC ............ *G06Q 40/12* (2013.12); *G06Q 20/10* (2013.01); *G06Q 40/00* (2013.01)

(58) Field of Classification Search
  CPC ..................................................... G06Q 40/12
  USPC ......................................................... 705/39
  See application file for complete search history.

(56) References Cited

U.S. PATENT DOCUMENTS

| | | | | |
|---|---|---|---|---|
| 5,465,328 | A * | 11/1995 | Dievendorff | G06F 11/1471 707/999.202 |
| 6,353,828 | B1 * | 3/2002 | Ganesh | G06F 17/30362 |
| 6,662,199 | B1 * | 12/2003 | Flight | G06Q 10/06 707/694 |
| 6,850,938 | B1 * | 2/2005 | Sadjadi | G06F 17/30362 |
| 6,889,249 | B2 * | 5/2005 | Miloushev | G06F 11/1076 707/999.01 |

(Continued)

OTHER PUBLICATIONS

Nie, Y. (., & Zhang, H. M. (2010). Solving the dynamic user optimal assignment problem considering queue spillback. Networks and Spatial Economics, 10(1), 49-71. http://dx.doi.org/10.1007/s11067-007-9022-y Retrieved from https://dialog.proquest.com/professional/docview/205821299?accountid=142257 (Year: 2010).*

(Continued)

*Primary Examiner* — Kito R Robinson
(74) *Attorney, Agent, or Firm* — Thomas | Horstemeyer, LLP

(57) ABSTRACT

Disclosed are various embodiments for employing spillover tables that may improve the performance of data store updates. In some embodiments, transaction data that specifies a value by which to adjust a field in a data table is received. The field in the data table is associated with a predefined constraint. An attempt to obtain an exclusive lock for at least a portion of the data table is initiated. Whether the value has a potential to cause the predefined constraint to remain satisfied is identified. The transaction data is stored in a spillover table in response to a failure to obtain the exclusive lock and in further response to the value having the potential to cause the predefined constraint to remain satisfied.

20 Claims, 7 Drawing Sheets

(56) References Cited

U.S. PATENT DOCUMENTS

| | | | | |
|---|---|---|---|---|
| 6,988,099 B2* | 1/2006 | Wiser | | G06F 9/466 |
| 7,233,947 B2* | 6/2007 | Lomet | | G06F 17/30551 |
| | | | | 707/703 |
| 7,509,653 B2* | 3/2009 | Das | | G06F 9/546 |
| | | | | 707/999.01 |
| 7,640,545 B2* | 12/2009 | Kumar | | G06Q 20/108 |
| | | | | 705/70 |
| 8,311,935 B2* | 11/2012 | Balachandran | | G06Q 20/04 |
| | | | | 705/38 |
| 2002/0099559 A1* | 7/2002 | Liu | | G06F 17/30952 |
| | | | | 705/27.1 |
| 2002/0120763 A1* | 8/2002 | Miloushev | | G06F 11/1076 |
| | | | | 709/230 |
| 2004/0068501 A1* | 4/2004 | McGoveran | | G06F 11/1474 |
| 2004/0158549 A1* | 8/2004 | Matena | | G06F 11/2097 |
| 2004/0236746 A1* | 11/2004 | Lomet | | G06F 17/30551 |
| 2005/0174272 A1* | 8/2005 | Cadambi, Sr. | | G06F 17/30949 |
| | | | | 341/106 |
| 2006/0190504 A1* | 8/2006 | Pruet, III | | G06F 17/30362 |
| 2007/0094064 A1* | 4/2007 | Yankovich | | G06Q 10/10 |
| | | | | 705/42 |
| 2007/0179936 A1* | 8/2007 | Rajakumar | | G06F 9/526 |
| 2007/0255651 A1* | 11/2007 | Egetoft | | G06Q 20/10 |
| | | | | 705/39 |
| 2009/0077135 A1* | 3/2009 | Yalamanchi | | G06F 17/30359 |
| 2016/0179865 A1* | 6/2016 | Bortnikov | | G06F 17/30362 |
| | | | | 707/704 |

OTHER PUBLICATIONS

Mitra, Debasis. Probabalistic models and asymptotic results for concurrnt Processing with Exclusive and non-exclusive locks. SIAM J. Comput. 1985 vol. 14, issue 4, pp. 1030-1051.

* cited by examiner

EMPLOYING SPILLOVER TABLES FOR DATA UPDATES

CROSS-REFERENCE TO RELATED APPLICATIONS

This patent application is a continuation of and claims priority to U.S. patent application Ser. No. 12/823,733, filed on Jun. 25, 2010 and titled "Employing Spillover Tables for Data Updates," which is incorporated by reference herein in its entirety.

BACKGROUND

In an electronic commerce system, data elements that track a variable, such as an account associated with a user and/or entity that tracks an account balance, can be subjected to significant rates of activity. As one example, an account associated with a seller in an electronic commerce system can be credited many times per second if the seller is a high volume seller. Accordingly, it can be difficult to provide for a high volume of transactions that update an account or other data associated with such a seller if the updating of an account requires a lock on a data store table and/or field that contains its value. High velocity updates of an account balance or other data field can be a performance bottleneck in an electronic commerce system when the system is processing a high volume of requests that require a lock on a data store.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In the following discussion, a general description of the system and its components is provided, followed by a discussion of the operation of the same. Embodiments of this disclosure are directed to systems and methods of improving performance of updating of data fields and/or records in a data store or database. Accuracy of certain fields in a data store can be critical, particularly in the case of banking and/or commercial environments where financial transactions are posted to accounts associated with a money balance. These transactions can update and/or access a balance associated with an account, and may often occur at high velocities or rates. In other words, there may be many transactions per second that try to update and/or access a data field associated with an account in a data store environment.

Because of the importance of accuracy of an account balance in a banking or commercial environment, an exclusive lock on one or more tables in a data store from which an account balance is determined or other concurrency control mechanisms can be required to update a data field corresponding to an account balance. These measures can be required in order to ensure integrity of an account balance as well as reduce the possibility of transaction collisions corrupting a value of the account balance. This can reduce performance or cause data store unavailability during periods of high volumes of transactions that require and/or request an exclusive lock on the data store and/or tables or fields within the data store. Accordingly, embodiments of this disclosure accommodate high velocity updates of data fields in tables of a data store while maintaining integrity of the values derived from the data fields by employing a spillover table when an exclusive lock on a data store and/or table cannot be secured.

Figure 1:
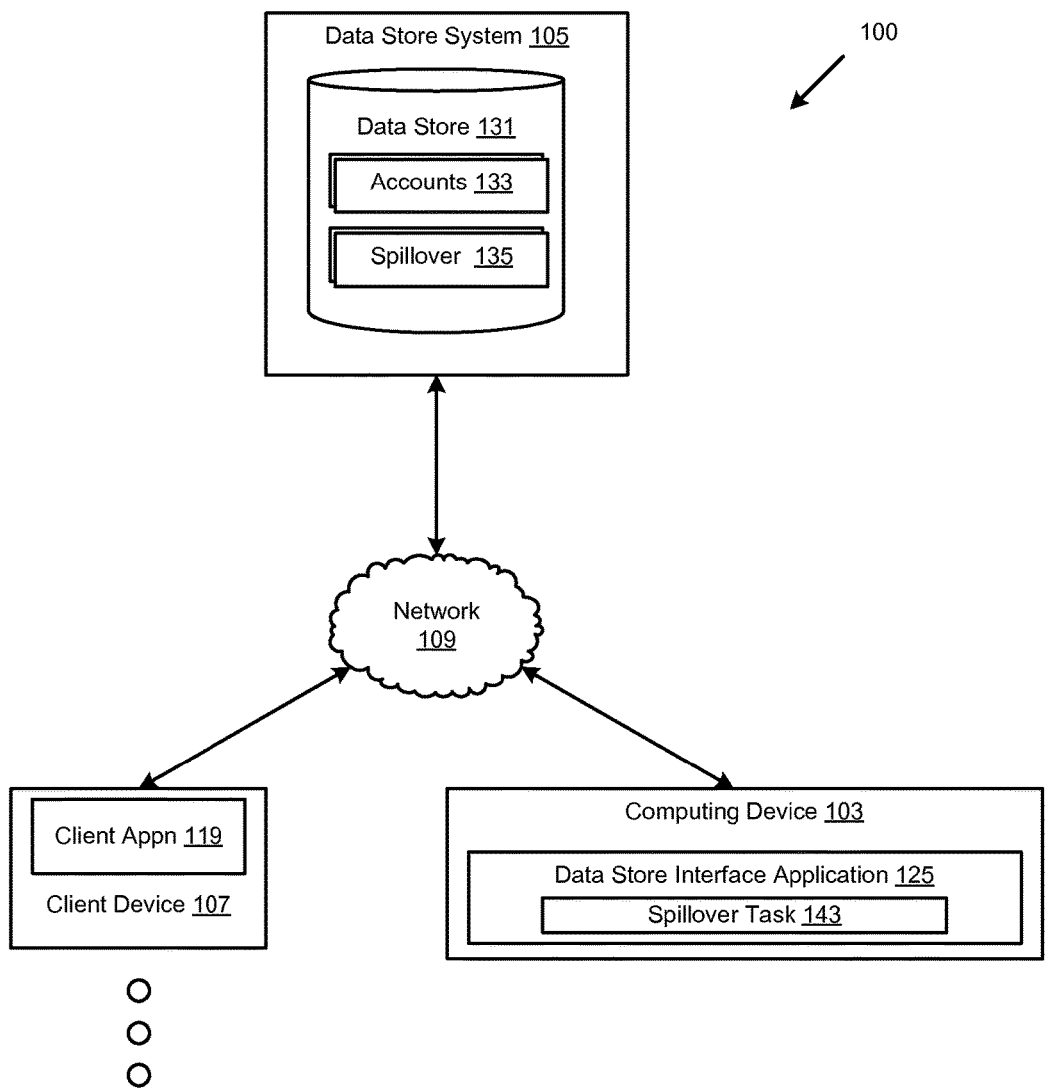
FIG. 1 is a drawing of a networked environment according to various embodiments of the present disclosure.

With reference to FIG. 1, shown is a networked environment 100 according to various embodiments. The networked environment 100 includes one or more computing device 103, a data store system 105, and client device 107 in communication via a network 109. The network 109 includes, for example, the Internet, intranets, extranets, wide area networks (WANs), local area networks (LANs), wired networks, wireless networks, or other suitable networks, etc., or any combination of two or more such networks.

The computing device 103, data store system 105, and client device 107 may comprise, for example, a server computer or any other system providing computing capability. Alternatively, a plurality of computing devices may be employed that are arranged, for example, in one or more server banks, or computer banks, or other arrangements. For example, a plurality of computing devices together may comprise, for example, a cloud computing resource, a grid computing resource, and/or any other distributed computing arrangement. Such computing devices may be located in a single installation or may be dispersed among many different geographical locations. For purposes of convenience, the computing device 103 is referred to herein in the singular. Even though the computing device 103 is referred to in the singular, it is understood that a plurality of computing devices may be employed in the various arrangements as described above.

Various applications and/or other functionality may be executed in the computing device 103 according to various embodiments. The components executed on the computing device 103, for example, include a data store interface application 125, and other applications, services, processes, tasks, systems, engines, or functionality not discussed in detail herein. The data store interface application 125 is executed to facilitate interaction with a data store system 105 and the data store 131. As one example, a web application or other application may request data from a data store 131 in order to encode a network page for a user. Additionally, a web application or other type of application may submit data to the data store 131 for various reasons that can be appreciated. The data store interface application 125 can facilitate retrieval of data from the data store 131 as well as submission of data to the data store 131 for storage. Additionally, the data store interface application 125 facilitates high velocity updates to data fields in a data store for which data integrity is of high importance and for which concurrency control mechanisms may be in place to ensure data integrity, which will be discussed in more detail below.

Various applications and/or other functionality may be executed in the data store system 105 according to various embodiments. The data store system 105 facilitates database and/or data store functionality as can be appreciated. In this regard, the data store system 105 can include a data store 131 that is accessible to the computing device 103 via the network. The data store 131 may be representative of a plurality of data stores as can be appreciated. The data stored in the data store 131, for example, is associated with the operation of the various applications and/or functional entities in the depicted networked environment 100. The data stored in the data store 131 includes, in one example, an accounts table 133, one or more spillover tables 135, and potentially other data.

The accounts table 133 can include any data regarding an account associated with a user or entity in a commercial environment. In one embodiment, the accounts table 133 can be associated with buyers and sellers in an electronic marketplace and/or electronic commerce system. In this example, a person or entity in an electronic commerce system can be assigned an account that is credited and/or debited depending on purchases, sales, marketplace fees, and other amounts that can cause a credit and/or debit as can be appreciated. Accordingly, in one example, the account data associated with an account in the accounts table 133 can include an account balance data field.

Accounts in the accounts table 133 can also include an account constraint. An account constraint associated with an account is an account rule that the account must follow with regard to a data field associated with the account. Accordingly, transactions posted to the account cannot violate such a constraint or they can be refused or rolled back by the data store system 105. As one example, an account constraint associated with an account can be established to provide that the account balance of an account cannot be lower than zero. As another example, an account constraint can include other types of account rules that must be followed in order for a data field associated with an account to be modified. For example, an account constraint can provide that for an account balance field, transactions larger than a threshold amount are not allowed, and refuse or roll back such a transaction if attempted. Other examples of account constraints should be appreciated by a person of ordinary skill in the art.

The components executed on the client device 107 include, for example, a client application 119 and other applications, services, processes, systems, engines, or functionality not discussed in detail herein. A client application 119 can be any application, software and/or service that may submit a request to the data store interface application 125 to retrieve data from data store system 105 and/or submit data to the data store system 105. In some embodiments, a client application 119 can include a network service, such as a web server or an application server that serves requests from users interacting with the client application 119 via a browser or other application. In order to serve requests from a browser, for example, the client application 119 may request data from the data store 131 via the data store interface application 125. Additionally, in order to submit data related to the servicing of such a request to the data store 131, the client application 119 may make such a submission to the data store interface application 125, which can interact with the data store system 105 on its behalf.

Next, a general description of the operation of the various components of the networked environment 100 is provided. As noted above, the data store interface application 125 can facilitate high velocity updates to data fields within the data store 131 that are accessible via the data store system 105. Certain data fields or tables within a data store 131 may employ an exclusive lock or other concurrency control mechanism, such as an optimistic lock, etc., in order for updates to a particular piece of data in the data store 131 to be applied. Concurrency control mechanisms, while helping to ensure integrity and accuracy of a data field or a table in the data store 131, can also reduce throughput or performance of the data store system 105.

By way of illustration, if multiple client applications 119 in the networked environment submit a request to update an account balance data field associated with an account in the accounts table 133, and these requests arrive at the data store interface application 125 substantially simultaneously, it is possible that not all of them will be immediately granted access to post an update to the account balance data field. Therefore, at least one of the client applications 119 attempting to update the account balance data field will be rejected in its attempt. Accordingly, the rejected client application 119 may be asked to wait and try to post the update at a later time. It should be appreciated that such a scenario can manifest itself in an electronic commerce environment, for example, if an account is associated with a seller who experiences high sales volumes. In this example, various client applications 119 facilitating the electronic commerce system may process sales and then attempt to credit the seller's account in the data store system 105 via the data store interface application 125, and these attempts may occur substantially simultaneously. In such a scenario, one or more of these various client applications 119 may be prevented from updating the seller's account in the data store system 105 and be forced to wait in order to submit the update, which may prevent the client application 119 from servicing other requests from users.

Accordingly, the data store system 105 can provide a spillover 135 table, which, in conjunction with the data store interface application 125, can facilitate high velocity updates to data fields in the data store 131, such as an account balance data field associated with an account. In one embodiment, a client application 119 can submit an update to a data field in the data store 131 via an application programming interface provided by the data store interface application 125. The data store interface application 125 can request an exclusive lock or other access to the data store 131 that is in place to ensure integrity of the data field provided by a concurrency control mechanism. If such access is granted to the data store interface application 125, then the data store interface application 125 can post the data field update to the data store 131 on behalf of the client application 119. In the example of an electronic commerce system in which a seller has sold a product or service, the client application 119 can submit a transaction that describes amount by which the seller's account balance should be changed or credited, and the data store interface application 125 can perform an update to the seller's existing account balance in a data field by calculating a new account balance and overwriting the existing data field.

If the data store 131 in the data store system 105 does not grant access to the data store interface application 125 so that the data field update can be performed, the data store interface application 125 can write the update to the spillover table 135. In the above example of an electronic commerce system, the data store interface application 125 can insert an entry describing an amount by which to update an account balance associated with an account in the data store into the spillover table 135. In other words, the transaction received by the data store interface application 125 can be inserted into the spillover table 135.

In this framework, the data store interface application 125 can perform an insert operation in order to append an amount by which an account is to be updated onto the spillover table 135. It should be appreciated that an insert operation in a table of the data store 131 can be performed more efficiently than an update operation where concurrency control mechanisms are in place that can require an exclusive lock on a table and/or record. Additionally, in some embodiments, the spillover table 135 can be configured such that an exclusive lock on the table is not required in order to perform an insert operation as described above. Accordingly, transactions to update a field and/or record in a table such as the accounts table 133 can be submitted in rapid succession and, in some embodiments, substantially simultaneously, as an exclusive lock on the record being updated in the accounts table 133 is not required. The spillover table 135 can therefore contain multiple records associated with various accounts that describe an amount by which an account balance should be updated.

It should also be appreciated that the data store interface application 125 may receive and process a request to look up the value of a data field for which entries appear in the spillover table 135. As one example, a client application 119 configured to encode a network page that displays an account balance associated with an account in an electronic commerce system can request an account balance associated with the account from the data store interface application 125. In this scenario, the spillover table 135 may contain entries associated with the account that describe amounts by which the account balance should be updated. However, these entries in the spillover table 135 may not yet have been posted to the accounts table 133 in the data store 131.

Accordingly, the data store interface application 125 can calculate a balance by combining the entries associated with the requested account in the accounts table 133 and in the spillover table 135 in order to calculate the correct account balance. Additionally, in order to ensure integrity of a requested data field or record for which a value is requested, the data store interface application 125 can perform a join operation that joins the requested data field associated with an account with spillover table 135 entries also associated with the account. In one embodiment, values of the data fields from the resultant join operation can be totaled in order to return an accurate value as of the time the request was processed. In another embodiment, the result of the join operation can be placed in a separate table, and the values of the data field and the spillover entries tabulated in order to return an accurate value as of the time the request was processed. In the example of an account balance associated with an account in the accounts table 133, the values in the separate table can simply be totaled to arrive at a correct value of the requested account balance.

A join operation can be employed to extract a value for the requested data field as well as the spillover table 135 entries because a join operation can extract the values needed to determine an accurate value as of the time the request is processed in a single query. If multiple operations are employed to extract the values needed to determine a requested data field, there exists a risk that either the data field in the accounts table 133 or the entries associated with the account in the spillover table 135 may change in the time between the processing of the queries by the data store system 105, which could cause the value returned to the client application 119 to be inaccurate as of the time the request was submitted to the data store interface application 125.

The data store interface application 125 can also execute a spillover task 143, which is configured to collapse or post transactions in the spillover table 135 into the accounts table 133 or another table for which the spillover table 135 is configured. In other words, the spillover task 143 can update a value of a data field in the accounts table 133 with entries from the spillover table 135 that are associated with the data field. In the example of an account balance that is stored in the accounts table 133, the spillover task 143 can update the account balance by the amounts described in the spillover table 135 entries associated with the account. In some embodiments, the spillover task 143 can be executed as a background task that is periodically attempting to obtain an exclusive lock on the data store 131 and/or tables or fields within the data store 131 in order to post transactions that are in the spillover table 135.

Because accounts in the accounts table 133 can also include constraints that cannot be violated by the data store interface application 125, the data store interface application 125 can be configured to place entries in the spillover table 135 that do not violate the account constraint or cause the account to move closer to violating an account constraint. As one example, if the account is associated with a constraint that the account balance cannot be less than zero, then the data store interface application 125 can be configured to only insert entries into the spillover table 135 that are positive account balance updates. By employing such a scheme, the data store interface application 125 removes the possibility of an entry in the spillover table 135 from causing the account constraint to be violated. In other words, in such an example, a positive account balance update submitted by a client application 119 cannot cause the account balance to violate the above example account constraint, so it can be placed in the spillover table 135 by the data store interface application 125.

Continuing the above example, if a negative account balance update is received by the data store interface application 125 for the account that has the above account constraint, the data store interface application 125 can be configured to not place the transaction in the spillover table 135. This can remove a risk of violating an account constraint due to a race condition. As an example, two negative account balance update transactions can be received by the data store interface application 125 substantially simultaneously. Even if the transactions by themselves do not cause the account balance to violate an account constraint, they may together cause the account balance to violate the account constraint. Accordingly, a transaction that carries a risk of violating an account constraint can be deemed ineligible to be placed in the spillover table 135.

For these ineligible transactions, the data store interface application 125 can wait until an exclusive lock can be obtained on a data table or data field that a transaction is updating and process the transaction when a lock can be obtained or when a concurrency control mechanism can be complied with. When a lock can be obtained on the table or field related to an ineligible transaction, the data store interface application 125 can also process entries in the spillover table 135 that describe updates to the data field and/or table for which the ineligible transaction describes an update. In this way, the data store interface application 125 can ensure that transactions that were entered in the spillover table 135 prior to receiving the ineligible transaction are also reflected in the data field. Continuing the above example, the spillover table 135 can contain various entries that are positive account balance updates. In one embodiment, the spillover table 135 entries can be associated with a timestamp that is related to an order in which the transactions are received by the data store interface application 125.

Accordingly, if the data store interface application 125 receives a negative account balance update, upon receiving a lock on the field, records and/or table associated with the account balance, the data store interface application 125 can update the account balance with the account balance update entries associated with the account that are in the spillover table 135. In one embodiment, the spillover table 135 entries and the ineligible transaction can be assigned a timestamp, and the application can update the account balance with the spillover table 135 entries having an earlier timestamp than the ineligible transaction so that the account balance in the accounts table 133 reflects the transactions that were received and assigned a timestamp by the data store interface application 125 as of the time the ineligible transaction is timestamped.

The spillover task 143 can be configured to attempt to obtain an exclusive lock (or other lock as provided by a concurrency control mechanism) on the data field and/or table it is attempting to update, and update various data fields as directed by the spillover table 135 entries. As one example, the spillover table 135 may contain account balance updates, which specify an amount by which an account should change, associated with various accounts in the accounts table 133. Accordingly, if the spillover task 143 is able to obtain an exclusive lock on the accounts table 133 so that it can be assured of the integrity of the data stored therein, the spillover task 143 can then update the various account balances described by the posting of account updates from the spillover table 135 to the accounts table 133. The spillover task 143 can be configured to attempt an update of the accounts table 133 on a periodic basis. The spillover task 143 can also be configured to process a certain number of entries from the spillover table 135 and then release a lock on the accounts table 133 so that the data store 131 can process other transactions.

Figure 2:
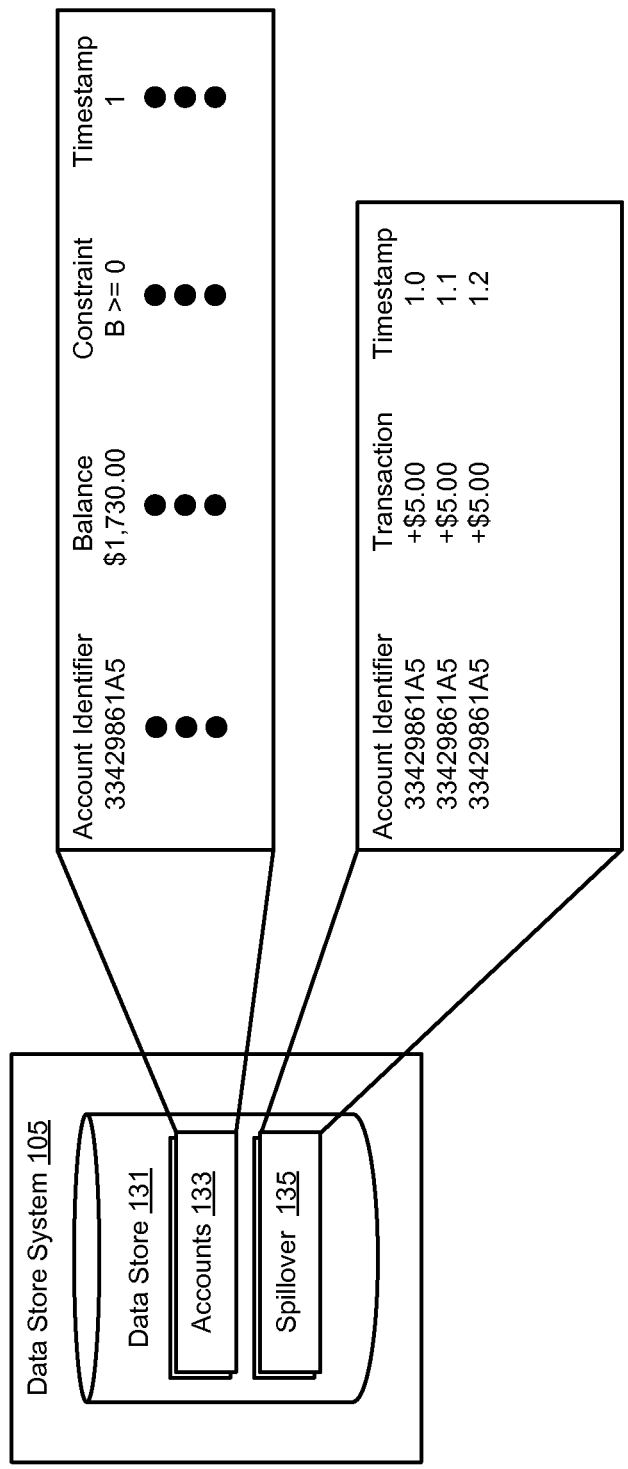
FIG. 2 is a drawing of a data store table structure employed in the data store and manipulated by the computing device in the networked environment of FIG. 1 according to various embodiments of the present disclosure.

Reference is now made to FIG. 2, which depicts an example of a structure of tables in a data store 131 according to an embodiment of the disclosure. FIGS. 2-5 depict one example of such a structure, and it should be appreciated that various alternative database table structures and formats can be employed according to embodiments of this disclosure. FIG. 2 depicts one example of an accounts table 133, which can contain various information related to an account in a commercial setting, such as in an electronic commerce system. In the depicted example, the accounts table 133 contains an account identifier column, an account balance column, a constraint column, and a timestamp column.

As described above, an account in the accounts table 133 can include a constraint which limits transactions that can be applied to the account. In the depicted example, the account shown in the accounts table 133 includes a constraint that the account balance must be greater than or equal to zero. Accordingly, if the data store interface application 125 (FIG. 1) receives a transaction to update a value associated with the account, such as an account balance, the data store interface application 125 can attempt to get an exclusive lock on the accounts table 133 and/or the record associated with the account. If the data store interface application 125 cannot obtain an exclusive lock on the account, which can occur if another data store 131 process has exclusive access to the table and/or record, then the transactions submitted to the data store interface application 125 can be placed in the spillover table 135.

Figure 3:
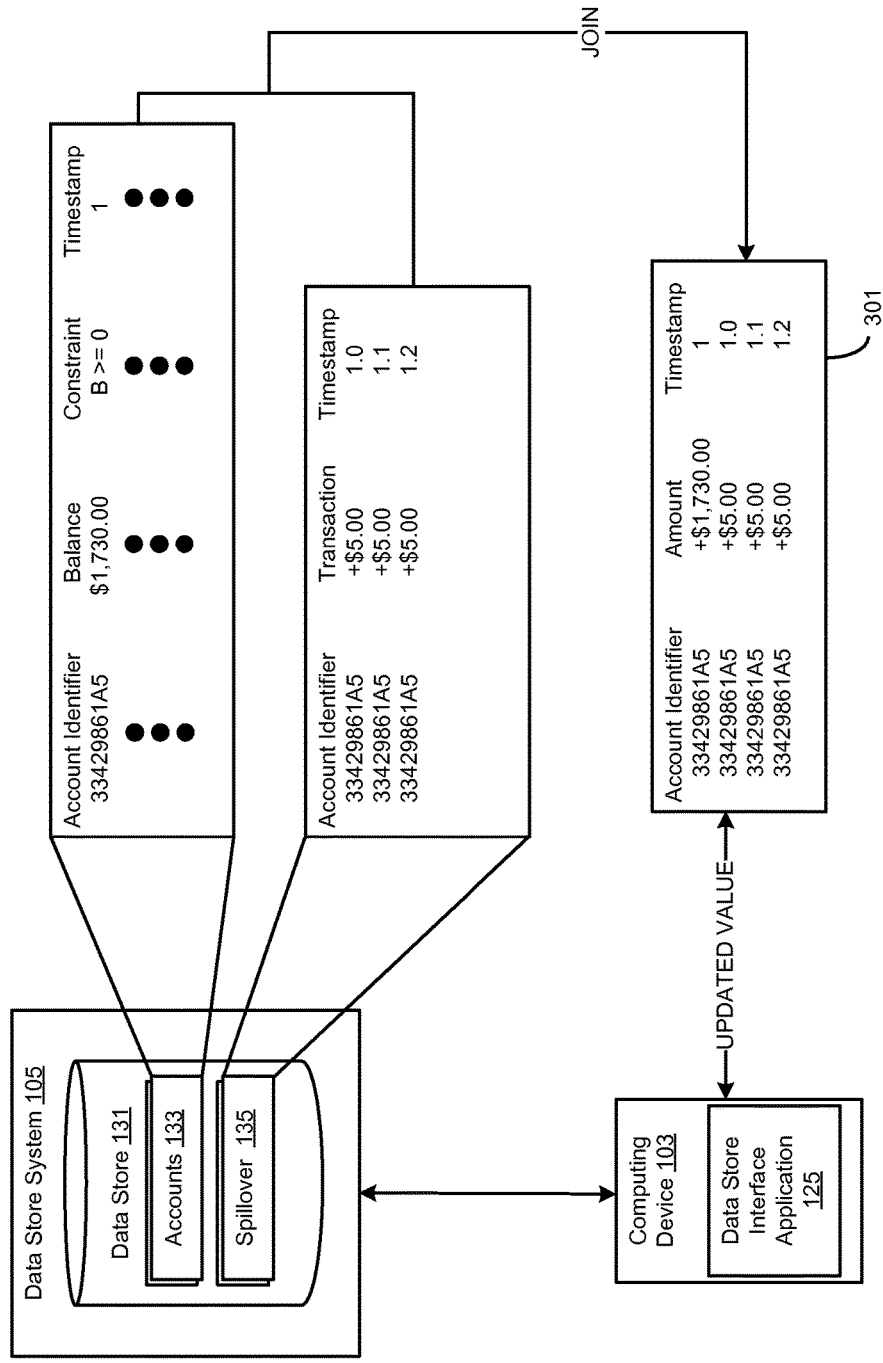
FIG. 3 is a drawing of a data store table structure employed in the data store and manipulated by the computing device in the networked environment of FIG. 1 according to various embodiments of the present disclosure.

Reference is now made to FIG. 3, which continues the example of FIG. 2 according to one embodiment of the disclosure. FIG. 3 depicts one example of the calculation of a value associated with a data field and/or record that also has associated entries in the spillover table 135. In the depicted example, an account balance associated with an account in the accounts table 133 is calculated by the data store interface application 125. Accordingly, if a client application 119 (FIG. 1) submits a request to the data store interface application 125 for an account balance of an account, the data store interface application 125 can retrieve the account balance stored in the accounts table 133 as well as entries in the spillover table 135 that are also associated with the account. In the depicted example, the spillover table 135 describes an amount by which an account should be changed according to a transaction submitted to the data store interface application 125. The data store interface application 125 can tabulate the account balance in the accounts table 133 as well as the entries in the spillover table 135 to arrive at an account balance.

In the depicted embodiment, the data store interface application 125 can perform a join operation that retrieves records from the accounts table 133 and the spillover table 135 that are associated with a particular account identifier and place these values in a second table 301. As noted above, the data store interface application 125 can perform a join operation rather than a multi-query statement to avoid the risk of entries being added to the spillover table 135 and/or an account balance update between queries. Accordingly, the data store interface application 125 can tabulate the amounts in the second table 301 to arrive at an account balance that takes into account the entries in the spillover table 135. In this way, from the perspective of a client application 119 submitting a request for an account balance, the value returned by the data store interface application 125 is consistent regardless of whether the account balance value exists solely in the accounts table 133 or in both the accounts table 133 and the spillover table 135. It should also be appreciated that in some embodiments, the data store interface application 125 can perform a join operation that retrieves the account balance from the accounts table 133 and the amounts associated with transactions in the spillover table 135 and sums these amounts in a single query rather than rely on placing the amounts in a second table 301.

Figure 4:
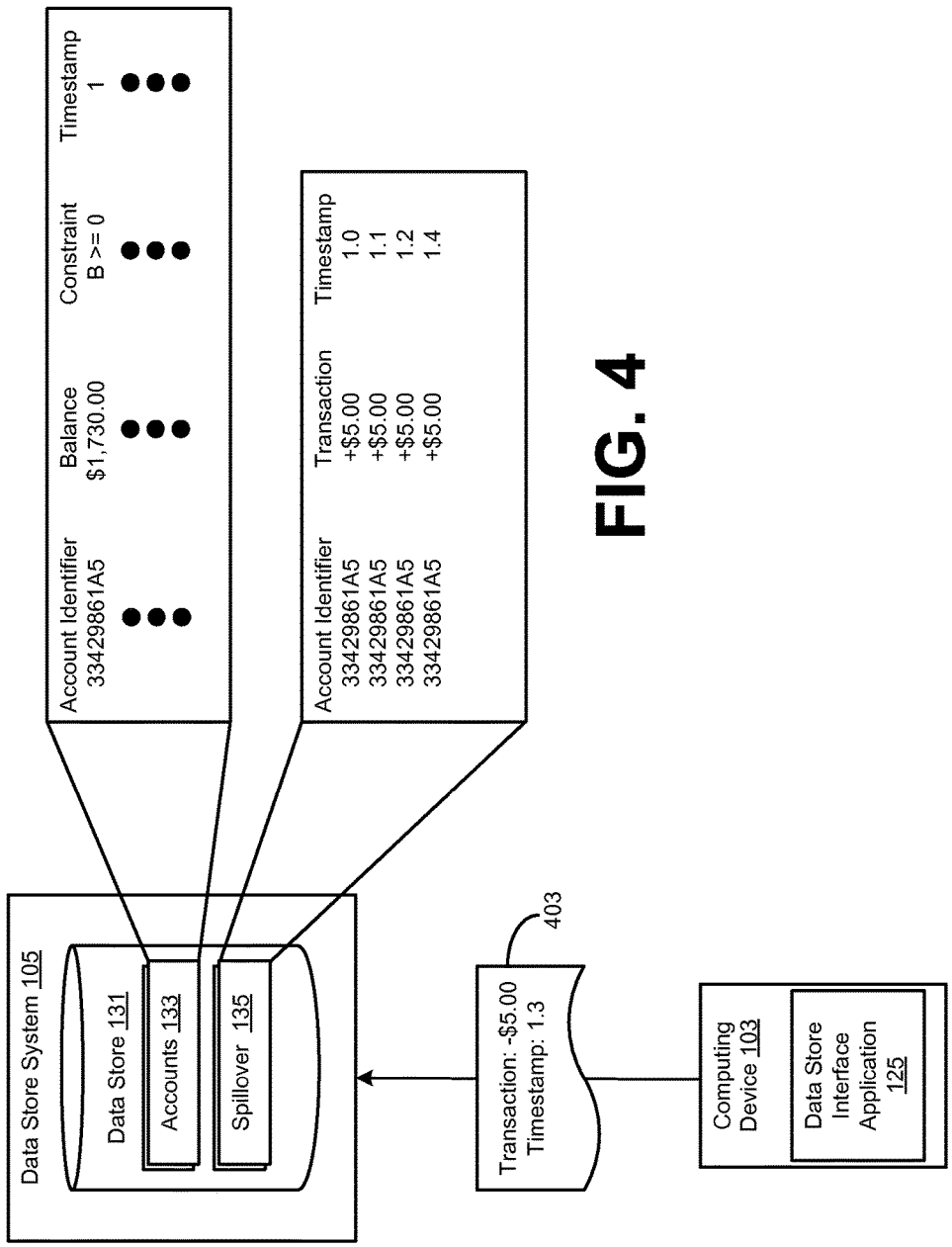
FIG. 4 is a drawing of a data store table structure employed in the data store and manipulated by the computing device in the networked environment of FIG. 1 according to various embodiments of the present disclosure.
Figure 5:
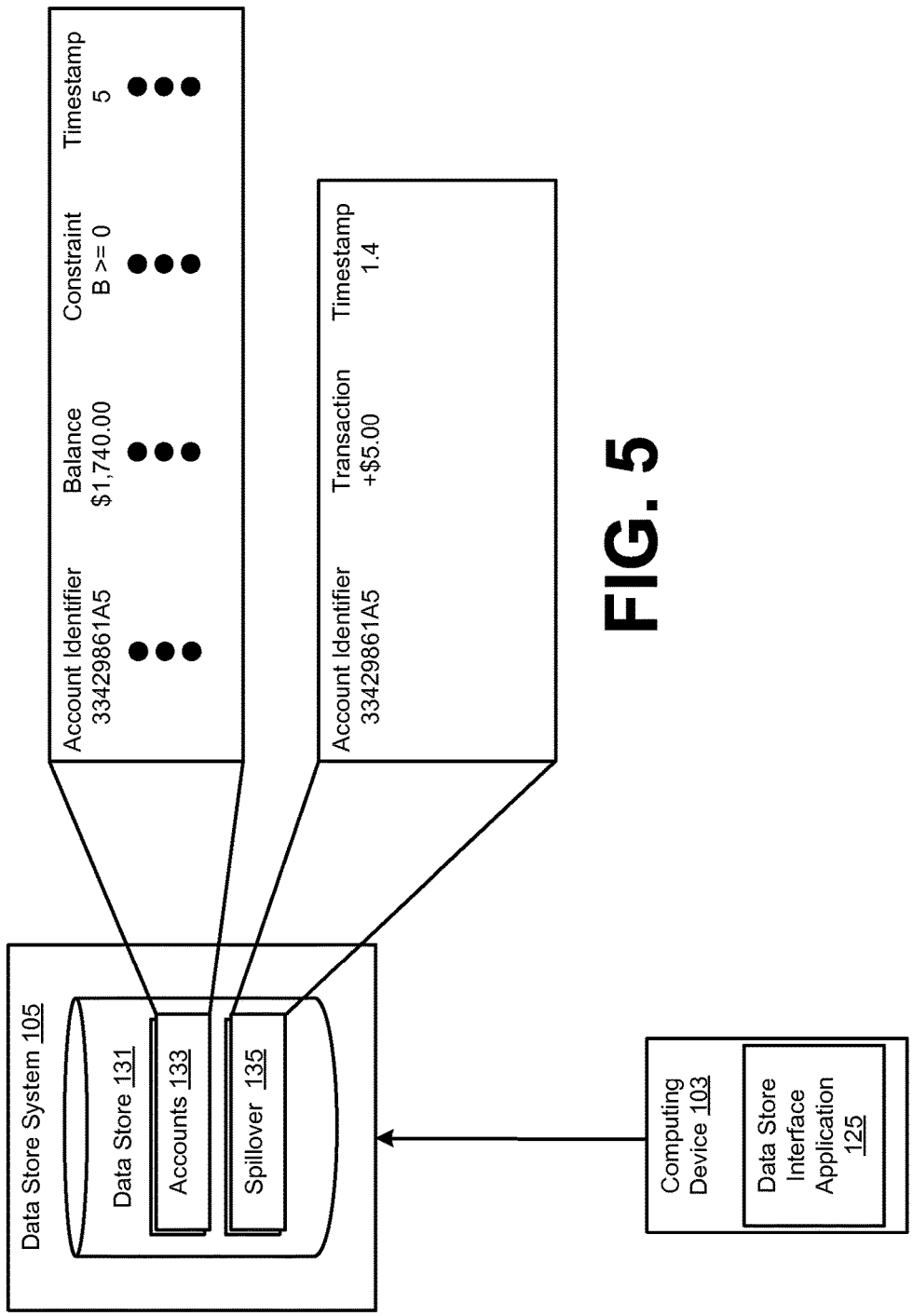
FIG. 5 is a drawing of a data store table structure employed in the data store and manipulated by the computing device in the networked environment of FIG. 1 according to various embodiments of the present disclosure.

Reference is now made to FIG. 4, which depicts one example of a transaction processed by the data store interface application 125 that is not placed in the spillover table 135. FIG. 4 also continues the example of FIGS. 2 and 3. In the depicted example, data associated with an account in the accounts table 133 and the spillover table 135 can be timestamped. A transaction submitted by a client application 119 (FIG. 1) to the data store interface application 125 can also be timestamped. FIG. 4 depicts an example of a transaction 403 being processed by the data store interface application 125 that is a transaction that has the potential to violate an account constraint associated with the account. Accordingly, as described above, the data store interface application 125 can process the transaction 403 by obtaining an exclusive lock on the accounts table 133, the record in the table, or comply with other concurrency control mechanisms enforced by the data store 131. Therefore, in one embodiment, the data store interface application 125 can process transactions in the spillover table 135 that have an earlier timestamp than the transaction 403 so that the value of the account balance in the accounts table 133 reflects the value as of the time the transaction is submitted and so that the data store interface application 125 does not maintain an exclusive lock on the accounts table 133 any longer than is needed to process the transaction 403.

In another embodiment, the data store interface application 125 can simply calculate an account balance associated with the accounts table 133 entry as well as the spillover table 135 entries associated with the account without regard to timestamp, and process the transaction 403 if the calculated account balance does not violate an account constraint associated with the account. In this way, the data store interface application 125 does not need to process the transactions in the spillover table 135 in order to process the transaction 403, but can simply determine whether the calculated account balance, taking into account the account balance in the accounts table 133, the transactions in the spillover table 135, and the amount specified in the transaction 403 would be greater than or equal to zero, and then commit or process the transaction 403 if the resultant balance of the account constraint is not violated.

In the depicted example, the spillover table 135 contains a transaction that is associated with a timestamp that is later than the transaction 403. Accordingly, reference is now made to FIG. 5, which depicts a result of the processing of the transaction 403 (FIG. 4) by an embodiment of the disclosure. In the depicted example, the account balance in the accounts table 133 has been updated by the data store interface application 125 processing the transaction 403 as well as the earlier timestamped transactions from the spillover table 135. However, the data store interface application 125 can leave transactions in the spillover table 135 that have a later timestamp compared to the transaction 403. The depicted transaction remaining in the spillover table 135 can be processed by the data store interface application 125 and posted to the accounts table 133 by the spillover task 143 or when another transaction is processed by the data store interface application 125 where the data store interface application 125 is able to secure an exclusive lock on the accounts table 133 or record associated with the account identified in the transaction.

Figure 6:
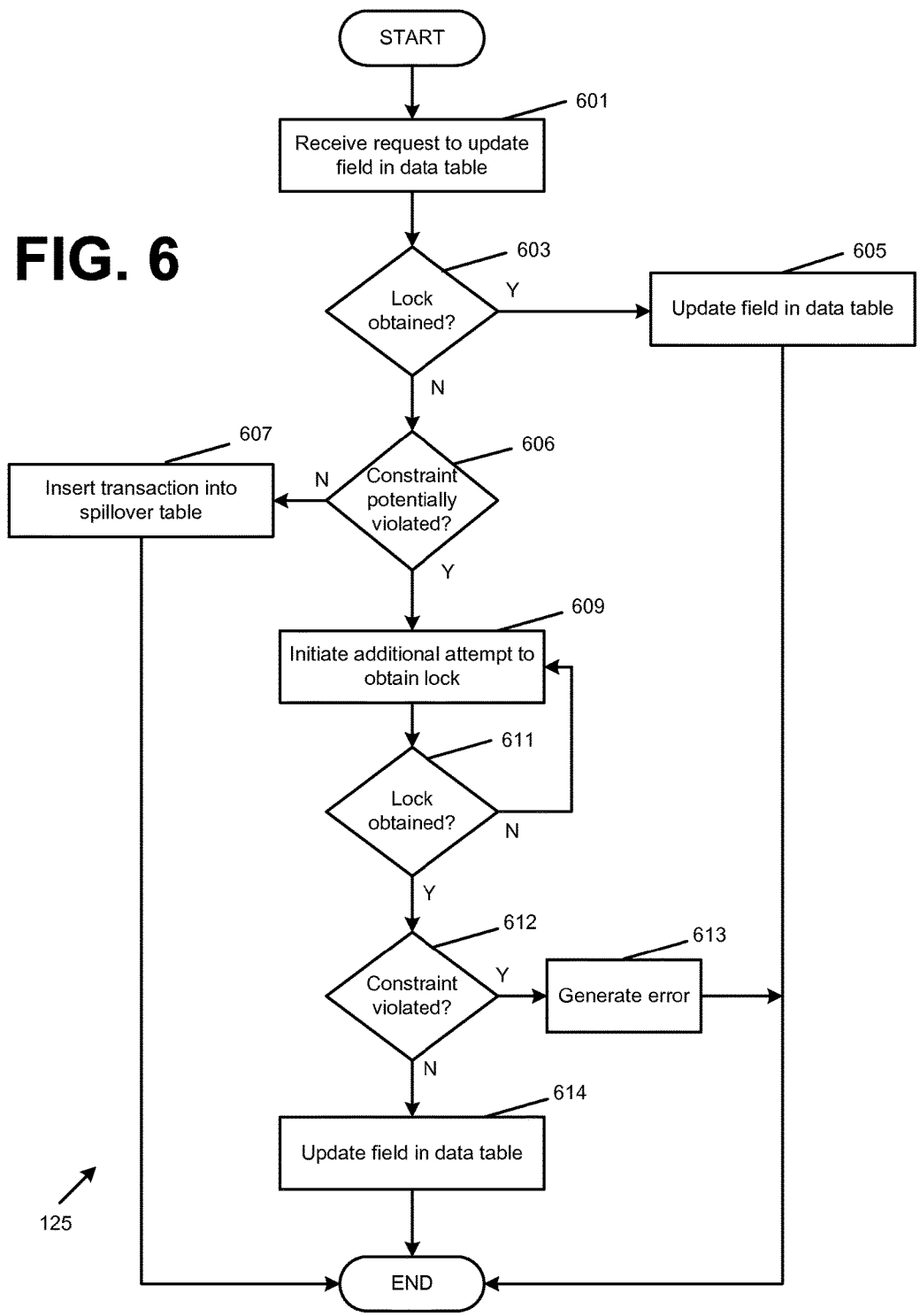
FIG. 6 is a flowchart illustrating one example of functionality implemented as portions of the data store interface application executed in a computing device in the networked environment of FIG. 1 according to various embodiments of the present disclosure.

Referring next to FIG. 6, shown is a flowchart that provides one example of the operation of a portion of the data store interface application 125 according to various embodiments. It is understood that the flowchart of FIG. 6 provides merely an example of the many different types of functional arrangements that may be employed to implement the operation of the portion of the data store interface application 125 as described herein. As an alternative, the flowchart of FIG. 6 may be viewed as depicting an example of steps of a method implemented in the computing device 103 (FIG. 1) according to one or more embodiments.

Beginning with box 601, a request and/or transaction is received from a client application 119 (FIG. 1) to update a field in a data table of the data store 131 (FIG. 1) with a data item contained in the request. In one embodiment, the transaction contains a request to update a field and/or record from an accounts table 133 (FIG. 1) with a data item and/or value contained in the request. As noted above, a request to update a field in a data table can include an amount by which a numeric field, such as an account balance associated with an account, should be changed. In box 603, the data store interface application 125 can attempt to obtain an exclusive lock on the data table or record that the transaction is attempting to update. If a lock is obtained, then in box 605, the data table in the data store 131 is updated.

If a lock is not obtained, then in box 606 the data store interface application 125 determines whether the transaction would potentially violate a constraint associated with the account. As described above, in some embodiments, the data store interface application 125 can determine whether the transaction would cause the account value to move closer to an account constraint. If no account constraint is potentially violated and/or the transaction does not cause the value to move closer to a constraint, then in box 607 the transaction is inserted into the spillover table 135 (FIG. 1) and the process ends.

Accordingly, in box 609, if an account constraint is potentially violated, then an additional attempt to secure a lock on the table and/or data store 131 is attempted. If a lock cannot be obtained, then the data store interface application 125 can initiate further attempts to obtain a lock. In some embodiments, the data store interface application 125 can initiate additional attempts after a predetermined period of time. In other embodiments, the data store interface application 125 can initiate additional attempts after successively larger periods of time. When a lock is obtained in box 611, the data store interface application 125 can determine whether an account constraint is actually violated in box 612. As noted above, the data store interface application 125 can determine an account balance by joining and tabulating entries associated with a particular account identifier in the accounts table 133 and spillover table 135. If an account constraint is actually violated, then the data store interface application 125 can generate an error in box 613 and the process ends. The data store interface application can update the accounts table 133 with the transaction that potentially violates an account constraint but does not actually violate the constraint in box 614.

Figure 7:
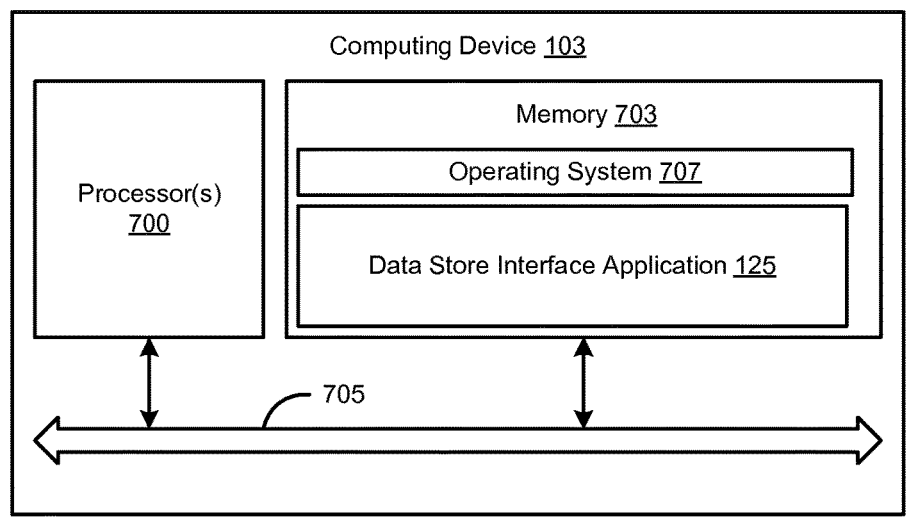
FIG. 7 is a schematic block diagram that provides one example illustration of a computing device employed in the networked environment of FIG. 1 according to various embodiments of the present disclosure.

With reference to FIG. 7, shown is a schematic block diagram of the computing device 103 according to an embodiment of the present disclosure. The computing device 103 includes at least one processor circuit, for example, having a processor 700 and a memory 703, both of which are coupled to a local interface 705. To this end, the computing device 103 may comprise, for example, at least one server computer or like device. The local interface 705 may comprise, for example, a data bus with an accompanying address/control bus or other bus structure as can be appreciated.

Stored in the memory 703 are both data and several components that are executable by the processor 700. In particular, stored in the memory 703 and executable by the processor 700 are data store interface application 125 and potentially other applications. In addition, an operating system 707 may be stored in the memory 703 and executable by the processor 700. It is understood that there may be other applications that are stored in the memory 703 and are executable by the processors 700 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 703 and are executable by the processor 700. In this respect, the term "executable" means a program file that is in a form that can ultimately be run by the processor 700. Examples of executable programs may be, for example, a compiled program that can be translated into machine code in a format that can be loaded into a random access portion of the memory 703 and run by the processor 700, source code that may be expressed in proper format such as object code that is capable of being loaded into a random access portion of the memory 703 and executed by the processor 700, or source code that may be interpreted by another executable program to generate instructions in a random access portion of the memory 703 to be executed by the processor 700, etc. An executable program may be stored in any portion or component of the memory 703 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 703 is defined herein as including both volatile and nonvolatile memory and data storage components. Volatile components are those that do not retain data values upon loss of power. Nonvolatile components are those that retain data upon a loss of power. Thus, the memory 703 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 700 may represent multiple processors 700 and the memory 703 may represent multiple memories 703 that operate in parallel processing circuits, respectively. In such a case, the local interface 705 may be an appropriate network 109 (FIG. 1) that facilitates communication between any two of the multiple processors 700, between any processor 700 and any of the memories 703, or between any two of the memories 703, etc. The local interface 705 may comprise additional systems designed to coordinate this communication, including, for example, performing load balancing. The processor 700 may be of electrical or of some other available construction.

Although the data store interface application 125 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 6 shows the functionality and operation of an implementation of portions of the data store interface application 125. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 700 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data store interface application 125, that comprises software or code can be embodied in any non-transitory computer-readable medium for use by or in connection with an instruction execution system such as, for example, a processor 700 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

For the Examiner's convenience, Applicants note that this application is a continuation of U.S. application Ser. No. 12/823,733. The claims of the present application are different and possibly, at least in some aspects, broader in scope than the claims pursued in the parent application. To the extent any prior amendments or characterizations of the scope of any claim or cited document made during prosecution of the parent could be construed as a disclaimer of any subject matter supported by the present disclosure, Applicants hereby rescind and retract such disclaimer. Accordingly, the references previously presented in the parent application may need to be revisited.

Therefore, the following is claimed:

1. A non-transitory computer-readable medium storing a plurality of computer instructions executable in a computing device, wherein the plurality of computer instructions, when executed by the computing device, cause the computing device to at least:
   receive a request to update an account balance for an account by an amount, wherein the account balance is represented in a data table, and wherein the account is associated with an account constraint;
   initiate an attempt to obtain an exclusive lock on at least a portion of the data table;
   at least in response to a failure to obtain the exclusive lock, identify whether the amount has a potential to cause the account constraint to remain satisfied; and
   at least in response to the amount having the potential to cause the account constraint to remain satisfied, store data associated with the request in a spillover table for the data table.

2. The non-transitory computer-readable medium of claim 1, wherein the account constraint specifies that the account balance is to be a non-negative balance.

3. The non-transitory computer-readable medium of claim 1, wherein the plurality of computer instructions further cause the computing device to at least identify whether the amount has the potential to cause the account constraint to remain satisfied by determining whether updating the account balance by the amount would cause the account balance to move closer to a predefined constraint value.

4. The non-transitory computer-readable medium of claim 1, wherein the plurality of computer instructions further cause the computing device to at least identify whether the amount has the potential to cause the account constraint to remain satisfied by identifying that the amount is non-negative.

5. The non-transitory computer-readable medium of claim 1, wherein the plurality of computer instructions further cause the computing device to at least update, upon the exclusive lock being obtained, the account balance represented in the data table using the data for the request that is stored in the spillover table, upon the exclusive lock being obtained.

6. The non-transitory computer-readable medium of claim 1, wherein the plurality of computer instructions further cause the computing device to at least update, upon the exclusive lock being obtained, the account balance represented in the data table using the data for the request and additional data for a plurality of additional requests that are stored in the spillover table.

7. A method, comprising:
   receiving, in at least one computing device, transaction data that specifies an amount by which to adjust an account balance for an account, wherein the account is represented in a data table, wherein the account is associated with an account constraint;
   initiating, using the at least one computing device, an attempt to engage a concurrency control mechanism for at least a portion of the data table;
   identifying, using the at least one computing device, whether the amount has a potential to cause the account constraint to remain satisfied; and
   storing, using the at least one computing device, the transaction data that specifies the amount by which to adjust the account balance in a spillover table for the data table at least in response to a failure of the concurrency control mechanism to engage and at least in further response to the amount having the potential to cause the account constraint to remain satisfied.

8. The method of claim 7, further comprising:
   receiving, in the at least one computing device, subsequent transaction data that specifies a negative amount by which to adjust the account balance; and
   storing, using the at least one computing device, the subsequent transaction data and the transaction data in the data table in response to the concurrency control mechanism being successfully engaged.

9. The method of claim 8, wherein the transaction data is stored in the data table prior to the subsequent transaction data being stored in the data table.

10. The method of claim 9, further comprising:
    storing, using the at least one computing device, a first time stamp for the transaction data; and
    storing, using the at least one computing device, a second time stamp for the subsequent transaction data, wherein the second time stamp identifies that the subsequent transaction data was received subsequent to the transaction data.

11. The method of claim 7, wherein identifying whether the amount has the potential to cause the account constraint to remain satisfied further comprises identifying whether the amount is positive.

12. The method of claim 7, wherein the account constraint specifies that the account balance is to be a non-negative balance.

13. The method of claim 7, wherein the concurrency control mechanism comprises an exclusive lock on the data table.

14. A system, comprising:
    at least one computing device; and
    a data store interface application executable by the at least one computing device, wherein the data store interface application, when executed by the at least one computing device, causes the at least one computing device to at least:
      receive transaction data that specifies a value by which to adjust a field in a data table, wherein the field in the data table is associated with a predefined constraint;
      initiate an attempt to obtain an exclusive lock for at least a portion of the data table;
      identify whether the value has a potential to cause the predefined constraint to remain satisfied; and store the transaction data in a spillover table for the data table at least in response to a failure to obtain the exclusive lock and at least in further response to the value having the potential to cause the predefined constraint to remain satisfied.

15. The system of claim 14, wherein the data store interface application further causes the at least one computing device to at least, upon the exclusive lock being obtained, update the field in the data table using the transaction data stored in the spillover table.

16. The system of claim 14, wherein the data store interface application further causes the at least one computing device to at least, upon the exclusive lock being obtained, update the field in the data table using the transaction data in the spillover table and additional transaction data in the spillover table, wherein the additional transaction data specifies an additional value by which to adjust the field in the data table.

17. The system of claim 14, wherein:
the field is for an account balance; and
the value specifies an amount by which to adjust the account balance.

18. The system of claim 14, wherein the predefined constraint specifies that the field is to be a non-negative amount.

19. The system of claim 14, wherein the data store interface application further causes the at least one computing device to at least:
receive additional transaction data that specifies a negative value by which to adjust the field; and
store the negative value and the value in the data table in response to the exclusive lock being obtained.

20. The system of claim 19, wherein the data store interface application further causes the at least one computing device to at least store the value in the data table prior to storing the additional transaction in the data table.

* * * * *